United States Patent
Richardson et al.

(10) Patent No.: US 7,099,881 B2
(45) Date of Patent: Aug. 29, 2006

(54) METHOD FOR INCREASING AVERAGE STORAGE CAPACITY IN A BIT-MAPPED TREE-BASED STORAGE ENGINE BY USING REMAPPABLE PREFIX REPRESENTATIONS AND A RUN-LENGTH ENCODING SCHEME THAT DEFINES MULTI-LENGTH FIELDS TO COMPACTLY STORE IP PREFIXES

(75) Inventors: Nicholas Julian Richardson, San Diego, CA (US); Suresh Rajgopal, San Diego, CA (US); Lun Bin Huang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 546 days.

(21) Appl. No.: 10/313,416

(22) Filed: Dec. 6, 2002

(65) Prior Publication Data

US 2004/0111439 A1 Jun. 10, 2004

(51) Int. Cl.
G06F 12/00 (2006.01)
G06F 17/30 (2006.01)
(52) U.S. Cl. .......................... 707/100; 707/3; 707/200
(58) Field of Classification Search ................ 707/3–7, 707/10, 104.1, 100–102, 200, 103 R, 1; 709/202, 709/238, 242, 247; 711/108, 216; 370/238, 370/252, 255, 351
See application file for complete search history.

(56) References Cited

U.S. PATENT DOCUMENTS

| | | | |
|---|---|---|---|
| 5,781,772 A * | 7/1998 | Wilkinson et al. | 707/3 |
| 6,014,659 A * | 1/2000 | Wilkinson et al. | 707/3 |
| 6,067,574 A * | 5/2000 | Tzeng | 709/247 |
| 6,385,649 B1 * | 5/2002 | Draves et al. | 709/224 |
| 6,430,527 B1 * | 8/2002 | Waters et al. | 703/3 |
| 6,522,632 B1 * | 2/2003 | Waters et al. | 370/254 |
| 6,581,106 B1 * | 6/2003 | Crescenzi et al. | 709/242 |
| 6,697,363 B1 * | 2/2004 | Carr | 370/389 |
| 6,928,430 B1 * | 8/2005 | Chien et al. | 707/3 |
| 2003/0174717 A1 * | 9/2003 | Zabarski et al. | 370/401 |

OTHER PUBLICATIONS

Degemark et al.:Small forwarding tables for fast routing lookups. ACM computer Communication Review 27, 4 (Oct. 1997), pp. 3-14.*

Lampson et al.: IP Lookups Using Multiway and Multicolumn Search. IEE/ACM Transaction on Networking (TON), vol. 7, Issue 3, Jun. 199, p. 324-334.*

Nilson et al.: IP-Address Looup Using LC Tries. IEEE Journal, vol. 17, Issue 6, Jun. 1999, pp. 1083-1092.*

* cited by examiner

Primary Examiner—Jeffrey Gaffin
Assistant Examiner—Jacques Veillard
(74) Attorney, Agent, or Firm—Lisa K. Jorgenson; William A. Munck

(57) ABSTRACT

Sparsely distributed prefixes within a bitmapped multi-bit trie are compressed by one or more of: replacing a single entry table string terminating with a single prefix end node with a parent table entry explicitly encoding a prefix portion; replacing a table with only two end nodes or only an end node and an internal node with a single parent table entry explicitly encoding prefix portions; replacing two end nodes with a single compressed child entry at a table location normally occupied by an internal node and explicitly encoding prefix portions; and replacing a plurality of end nodes with a prefix-only entry located at the table end explicitly encoding portions of a plurality of prefixes. The compressed child entry and the prefix-only entry, if present, are read by default each time the table is searched. Run length encoding allows variable length prefix portions to be encoded.

24 Claims, 6 Drawing Sheets

*FIG. 4*

| | | | |
|---|---|---|---|
| TRIE NODE, NORMAL | ct_bitmap (16 BITS) | child_ptr(20 BITS) | 0000 |
| TRIE NODE WITH INODE/CNODE | ct_bitmap (16 BITS) | child_ptr(20 BITS) | 0001 |

| | | | | |
|---|---|---|---|---|
| END NODE | 0 | nh_bitmap (15 BITS) | nexthop_ptr(20 BITS) | 1000 |
| INODE (INTERNAL NODE) | 0 | nh_bitmap (15 BITS) | nexthop_ptr(20 BITS) | 1001 |
| INODE WITH PNODE | 1 | nh_bitmap (15 BITS) | nexthop_ptr(20 BITS) | 1001 |

| | | | | |
|---|---|---|---|---|
| CNODE (COMPRESSED CHILD NODE) | PREFIX1 0-7 BITS | PREFIX2 0-7 BITS | nexthop_ptr(20 BITS) | 1010 |
| CNODE WITH PNODE | PREFIX1 0-7 BITS | PREFIX2 0-7 BITS | nexthop_ptr(20 BITS) | 1011 |

| | | | | | |
|---|---|---|---|---|---|
| PNODE (PREFIX-ONLY NODE) | PREFIX1 4-7 BITS | PREFIX2 4-7 BITS | PREFIX3 4-7 BITS | PREFIX4 4-7 BITS | PREFIX5 4-7 BITS |

| | | | |
|---|---|---|---|
| CSP NODE (COMPRESSED SINGLE PREFIX) | PREFIX 4-15 BITS (RLE) | nexthop_ptr(20 BITS) | 1100 |
| CDP NODE (COMPRESSED DOUBLE PREFIX) | PREFIX1 0-7 BITS / PREFIX2 0-7 BITS | nexthop_ptr(20 BITS) | 1101 |
| HEADER | UNUSED (16 BITS) | parent_ptr (20 BITS) | 1111 |

*FIG. 5A*

| HEADER |
|---|
| UP TO EIGHT TRIE NODES, END NODES, CSPs, CDPs |
| INODE OR CNODE |
| PNODE |

*FIG. 5B*

| HEADER |
|---|
| UP TO EIGHT TRIE NODES, END NODES, CSPs, CDPs |
| INODE OR CNODE |
| UP TO EIGHT TRIE NODES, END NODES, CSPs, CDPs |
| PNODE |

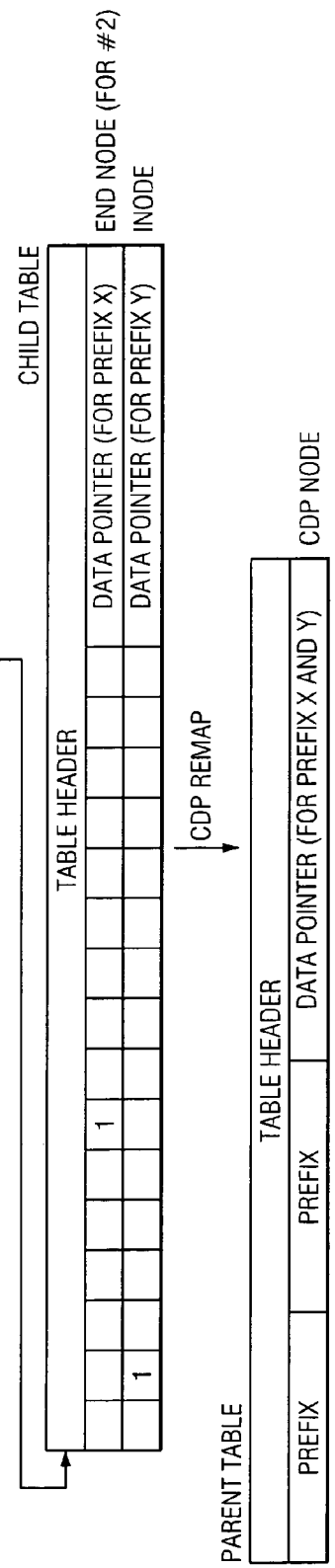

METHOD FOR INCREASING AVERAGE STORAGE CAPACITY IN A BIT-MAPPED TREE-BASED STORAGE ENGINE BY USING REMAPPABLE PREFIX REPRESENTATIONS AND A RUN-LENGTH ENCODING SCHEME THAT DEFINES MULTI-LENGTH FIELDS TO COMPACTLY STORE IP PREFIXES

TECHNICAL FIELD OF THE INVENTION

The present invention is directed, in general, to tree-based data structures employed, for example, in looking up Internet Protocol forwarding addresses and, more specifically, to bitmapped multi-bit tries.

BACKGROUND OF THE INVENTION

A trie (from the middle four letters of "retrieve") is a hierarchical data storage structure for storing and retrieving information items. The stored items consist of an address-prefix (normally referred to as just "prefix") plus data, where the prefix is employed as a tag for identifying the associated data (i.e., the prefix is similar to a file name, and the data is like the file contents). An item's data is retrieved by searching for the associated prefix with the value of the prefix as the search key (similar to finding a file based on knowledge of the filename and then retrieving the file's contents).

Prefixes in trie structures are hierarchically organized according to numeric value into an easily searchable tree structure. In single bit (or unibit) tries, each bit within the prefix defines which branch is to be followed at the corresponding level of the data structure hierarchy, and is constrained in access speed by the need to read each bit. Multi-bit (or expanded) tries use several bits, referred to as the stride length, at a time during searching to improve access speed, requiring that prefixes of a size less than an exact multiple of the stride length be expanded to the next stride length boundary.

Bitmapped multi-bit tries employ bitmaps to eliminate redundant information, and thus reduce the amount of memory and operations required to hold and update the trie. While compact and easily modifiable, further reduction in the amount of memory required to represent a trie holding a given number of prefixes are possible.

There is, therefore, a need in the art for improving bitmapped multi-bit tries and the use of such structures.

SUMMARY OF THE INVENTION

To address the above-discussed deficiencies of the prior art, it is a primary object of the present invention to provide, for use in a network router, compression of sparsely distributed prefixes within a bitmapped multi-bit trie by: replacing a single entry table string terminating with a single prefix end node with a parent table entry explicitly encoding a prefix portion; replacing a table with only two end nodes or only an end node and an internal node with a single parent table entry explicitly encoding prefix portions; replacing two end nodes with a single compressed child entry at a table location normally occupied by an internal node and explicitly encoding prefix portions; and/or replacing a plurality of end nodes with a prefix-only entry located at the table end explicitly encoding portions of a plurality of prefixes. The compressed child entry and the prefix-only entry, if present, are read by default each time the table is searched. Run length encoded allows variable length prefix portions to be encoded.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates table entry formats for use within remappable multi-bit tries according to one embodiment of the present invention;

FIGS. 5A and 5B illustrate table structures for remappable multi-bit tries according to one embodiment of the present invention;

FIGS. 6A through 6C illustrate various trie table entry remappings using multi-bit tries according to one embodiment of the present invention; and FIGS. 7A and 7B illustrate run length encoding of partial prefix entries for remappable multi-bit tries according to one embodiment of the present invention.

DETAILED DESCRIPTION OF THE INVENTION

FIGS. 1 through 7A–7C, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
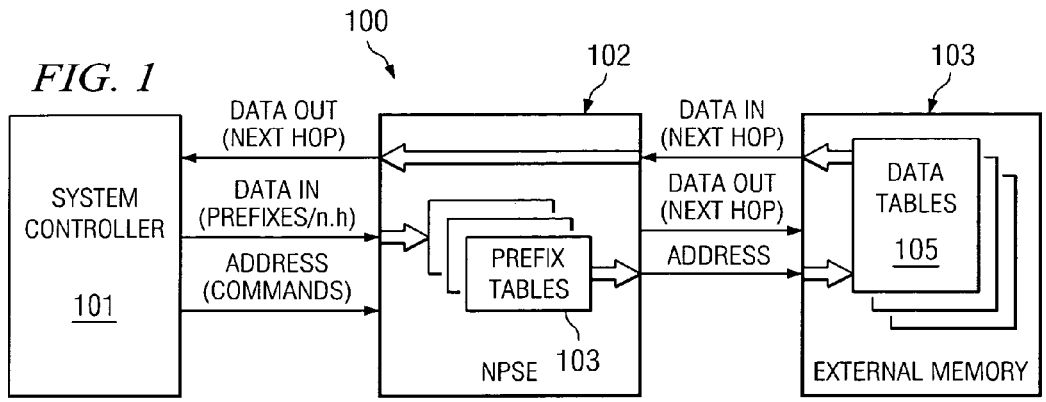
FIG. 1 depicts a processing system utilizing bit-mapped trie-based storage with remappable prefix representations according to one embodiment of the present invention.

FIG. 1 depicts a processing system utilizing bit-mapped trie-based storage with remappable prefix representations according to one embodiment of the present invention. Processing system 100 implements a portion of an Internet Protocol (IP) network router and includes a system controller 101 coupled to a network packet search engine (NPSE) 102, which in turn is coupled to external memory 103. NPSE 102 receives addresses for commands from system controller 101 as well as prefixes for the next hop address, and returns the next hop address to system controller 101. NPSE 102 transmits data table memory addresses to external memory, together with a data pointer to the next hop address within a data table, determined from prefix tables 104, to external memory 103. NPSE 102 receives from external memory 103 the next hop address from the table and entry within data tables 105 identified by the address and data pointer.

NPSE 102 is preferably coupled to system controller 101 by a high-speed 32-bit network processor unit (NPU) interface and to external memory 103 by a high-speed 32-bit static random access memory (SRAM) interface. Each interface is implemented by a quad data rate (QDR) architecture, with the system controller 101 as the master for the NPU interface and the external memory 103 as the slave for the SRAM interface, providing 32 bit simultaneous data input/output (I/O) at two words per clock with a maximum clock frequency of 250 mega-Hertz (MHz) for peak aggregate bandwidth of 4.5 gigabytes/second (GB/s).

Figure 2:
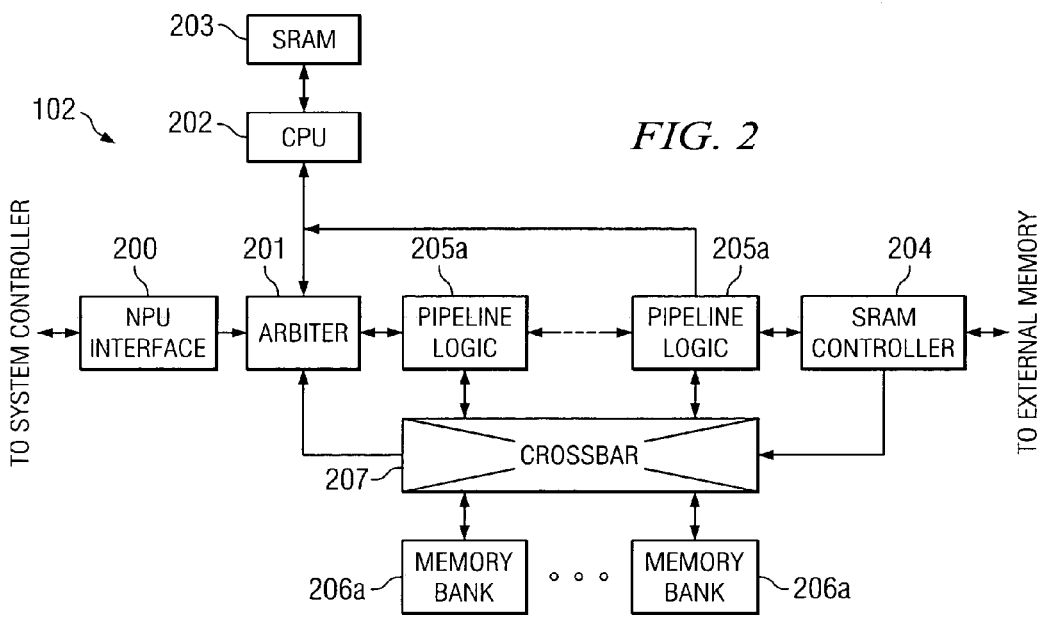
FIG. 2 depicts a network packet search engine within a processing system utilizing bit-mapped trie-based storage with remappable prefix representations according to one embodiment of the present invention.

FIG. 2 depicts a network packet search engine within a processing system utilizing bit-mapped trie-based storage with remappable prefix representations according to one embodiment of the present invention. NPSE 102 includes: an NPU interface 200 coupling the NPSE 102 to the system controller 101; an arbiter 201; a central processor unit (CPU) 202 with associated memory (SRAM) 203 containing the programs executed by CPU 202; an SRAM controller 204 coupling the NPSE 102 to the external memory 103; and an array (sixteen in the exemplary embodiment) of pipeline logic units 205a–205n and a corresponding set (also sixteen in the exemplary embodiment) of configurable memory blocks 206a–206n forming a series of virtual memory banks, with pipeline logic units 205a–205n and memory blocks 206a–206n coupled by a crossbar 207 enabling the virtual bank configurations. The major tasks performed by NPSE 102 are route insert, delete and search, which expect NPSE 102 to maintain the routing table by inserting routes into and deleting routes from the internal and external memory, and to perform a route search on the prefixes presented and return the associated next hop information.

The NPSE 102 improves organization and encoding of prefixes within a multi-bit trie in prefix memory, defining a "remappable multi-bit trie." In the present invention, the amount of prefix memory required to hold the multi-bit trie is reduced, thus reducing the cost of the device that implements the multi-bit trie in a hardware embedded memory. The prefix memory required to hold the multi-bit trie is reduced by improving on bit-mapped multi-bit tries, and thus also inherits the advantages of that algorithm which include an already memory-efficient prefix storage mechanism. The present invention also provides very good update times compared to other multi-bit trie implementations.

The standard multi-bit trie is a tree-based data structure created in the prefix and data memory to facilitate sorting and searching for prefixes according to numeric value, thus enabling a prefix of a particular value and the associated data to be quickly located by searching for a stored prefix matching a search-key. Prefixes are divided into segments of a small number of bits; for example, a 32-bit prefix may be logically divided into eight 4-bit segments. Prefixes are then hierarchically organized by segment values.

When entering a new prefix into a trie, or searching for an existing prefix, the prefix is processed one segment at a time. In the present invention, segments are all equally sized and are processed from left to right (most-significant to least-significant segment), although neither condition is a general restriction of multi-bit tries.

To enter a new prefix into a multi-bit trie, a table is created in the prefix memory for the prefix's first (i.e., most-significant or left-most) segment. If the prefix's segments have n bits (e.g., n=4), then the table created must have $2^n$ entries (e.g., $2^4$=16), one entry for each possible value of the segment. The entry within this table corresponding to the actual value of the new prefix's first segment is marked valid and a memory pointer, known as a "child-pointer," pointing to a second table, known as a "child table," is placed within that entry. The table entry containing the child-pointer is known as a trie-node.

The child table also has $2^n$ entries, one entry for each possible value of the new prefix's second (next to most-significant) segment. The entry within the child table corresponding to the value of the new prefix's second segment is marked valid, and a child-pointer to a third table (i.e., the child table of the second table) is placed in the entry to form another trie-node. This process continues in like manner for subsequent prefix segments until a table for the prefix's final (least significant) segment is created.

The entry in the final table that corresponds to the value of the prefix's final segment is marked as valid, but instead of a child-pointer to a new prefix table in prefix memory, the pointer, known as a "data-pointer," to a separate memory, the data memory, is placed therein. This type of entry is known as an end-node since it terminates the representation of the prefix. The end-node points to the location in data memory that contains the actual data associated with the prefix, and which will be retrieved when a search for the prefix's value is performed. Since the end-node terminates representation of the prefix and identifies the prefix's data, the end-node may be regarded as representing the actual prefix placed in the multi-bit trie.

The procedure described above is repeated each time a new prefix is entered into the trie. It is important to note that a new child table is created each time a new prefix is entered into the multi-bit trie and the point at which the prefix's value is found to differ from the value of any existing prefix while processing the prefix segments from left to right. This causes a tree of tables to be built for a particular value of all previous segments, with any given table effectively being a list of valid values for the prefix-segment associated with that table.

Once at least one prefix and the associated data has been entered into the trie, the algorithm allows for searching for a prefix of a given value (search key) in order to retrieve the associated data. The procedure to find a stored prefix matching a given search key is almost the same as that for entering a new prefix, except that no new tables or table entries are created. Instead, an existing chain of valid tables and their child-pointers corresponding to the search key's segment values is followed until either an entry containing a data pointer is encountered, in which case the data pointed to is returned as a result along with a "match found" status indicator, or a non-existent table-entry is encountered, in which case the search fails with a "no match found" status indicator.

To generalize, if a multi-bit trie stores prefixes of up to m segments, with each segment being n bits wide, then an m-level tree of tables, each with $2^n$ entries, is employed. Only one first-level (level 1) table exists, since the first-level table has no parent, with n trie-node entries containing child pointers, one for each value of the first segment, pointing to up to n child (level 2) tables. Each second-level (level 2) table in turn has n trie-node entries pointing in total to up to $n^2$ level 3 tables, and so on up to the last (mth) level of tables, of which there can be, in theory, up to $n^m$. Each table entry comprising a trie-node (child pointer) or end-node (data pointer) has an implicit segment-value corresponding to the entry's position within the respective table, and represents one of $2^n$ possible values of the corresponding n-bit prefix segment. When a prefix p is stored in the trie, the first n-bit segment of value $V_1$ is used as an index into the level 1 table to create an entry corresponding to $V_1$, which points to a second-level table. The second n-bit segment of value $V_2$ is then used as an index into that second-level table to create an entry corresponding to $V_2$, which points to a third-level table, and so on up to the final table entry required to represent the prefix of a given length, which contains an end-node containing a data pointer instead of a trie-node. Thus the full value represented by any entry in a table at a given level L is the positional segment value $V_L$, concatenated with the table's parent-entry positional segment value $V_{L-1}$, concatenated with the table's grandparent-entry positional segment value $V_{L-2}$, and so on up to the positional segment value of the level 1 table entry.

Among the advantages of standard multi-bit tries are fast search times (the time taken to find a prefix that matches a search key), which is proportional to the number of prefix segments (fixing the number of trie levels). Typically the number of prefix segments is relatively few, so that search times are independent of the number of prefixes in the table.

Standard multi-bit tries also produce a small prefix memory footprint. Prefixes having overlapping segment values, so that some contiguous segments from the first segment downward all have the same values, share the same table entries for those contiguous same-value segments due to the hierarchical nature of the algorithm, where a new table entry containing either a trie-node pointing to a new table or an end-node is inserted only at the point where the value of a segment differs from the values of corresponding segments for any previously-entered prefix. This potentially saves a great deal of memory over alternative methods (such as use of Content Addressable Memory or "CAM") that assign new memory locations for every prefix. Additionally, prefixes that are shorter than the maximum length m*n (i.e., have fewer segments than the maximum number of trie levels) only use the same number of table entries as they have n-bit segments, thus saving memory over methods that use fixed-length storage corresponding to the maximum length prefix.

Disadvantages of the standard multi-bit trie include waste of prefix table entries. When a new table is created, n entries are always reserved even though as little as only one entry may be used. Because table entries are accessed by their corresponding segment as an index into the table, unused table entries must be placed in the table to preserve the correct offset for the occupied entry or entries, as well as to indicate which segment values are invalid in order to correctly terminate table searches.

Standard multi-bit tries cannot handle prefixes that are not a multiple of the segment length. As noted earlier, prefixes may be of any length up to the maximum trie depth times the segment length (m*n). If a prefix is less than m*n bits in length, say 3n bits long, then the prefix will terminate after less than the maximum number of trie levels. However, if the prefix length is not a multiple of n, then an ambiguity over which entry in the final table to select arises since the prefix would terminate with a partial length segment insufficient to select one of the n final table entries.

Standard multi-bit tries also cannot handle prefixes with values that are fully overlapped by the values of longer prefixes (e.g., prefix 1="12345", prefix 2="123"). In this case, the tables would have to handle table entries that contain both a trie-node (to point to a child table for the longer prefix) and an end-node (to terminate the shorter prefix's pointer chain by pointing to the associated data).

Bit-mapped multi-bit tries improve on the standard multi-bit trie by solving the three disadvantages described above. A child table's empty entries caused by the prefix segment indexing scheme are eliminated by creating a bitmap associated with the trie-node in the parent table that points to the child table. The bitmap indicates which of the child table's entries are valid, and is used to compress the index into the child table using a combination of the child table's prefix segment and the bitmap of valid entries in the trie-node.

Prefixes that are not a multiple of the segment length n are handled in bit-mapped multi-bit tries by a special bitmap associated with the prefix's end nodes, by making each end node in a table at a given level L handle prefixes that are from L*n up to (L*n)+(n−1) bits long (instead of just L*n bits long, as in standard multi-bit tries). For instance, if an end node in the third level of a multi-bit trie having a prefix segment length of 4, normally the end node would only point to data for a single prefix of length L*n=3*4=12 bits. However, the same end node in a bit-mapped multi-bit trie would encode prefixes from length L*n=12 bits to length (L*n)+(n−1)=15 bits. The data pointer in such an end node would be shared among the multiple length prefixes encoded by the bitmap.

Note, however, that this new type of end node must encode all possible values of prefixes longer than the end node's positional value L*n. Thus there must be one bit in the bitmap for a prefix of length L*n, plus two bits for prefixes of length L*n+1 (i.e., L*n_0 and L*n_1), plus four bits for prefixes of length L*n+2 (i.e., L*n_00, L*n_01, L*n_10 and L*n_11), and so on up to $2^{n-1}$ prefixes of length (L*n)+(n−1). For instance, in the example of L=3 and n=4, an end node in the third level table would handle one prefix of length 12 bits, two prefixes of length 13 bits, four prefixes of length 14 bits, and eight prefixes of length 15 bits (up to fifteen prefixes total). In this case, a 15 bit bitmap in the end node would be needed to define which of the fifteen possible prefixes of length 12, 13 14 and 15 bits are actually valid, and hence the number of data items in data memory (up to 15) that are associated within the data pointer in the end node. So the validity of a prefix of a particular length and value is determined not only by the positional value of the end node's table entry, but also by the bit corresponding to the particular length and value in the end node's bitmap. Thus, each bit in an end node's bitmap may be thought of as a prefix bit representing a unique prefix of a particular length and value. If a prefix bit in the end node bitmap is found to be valid, then the associated data item is retrieved from data memory by counting the number of valid bits in the data pointer bitmap up to but not including the valid bit for the prefix bit in question, and adding that as an offset to the value of the end node's data pointer.

The problem of handing short prefixes whose values are fully overlapped by the values of longer prefixes across at least one segment boundary is solved in bit-mapped multi-bit tries by the concept of end node pushing. In this situation, the final table entry of the shorter prefix s contains an end node to identify the data item for that prefix. However, the exact same table entry for the longer prefix l must contain a trie node to point to the table for l's next full prefix segment. Therefore, because any given table entry can potentially be in the path of overlapping prefixes, where one prefix ends at that entry and another prefix continues, each entry must be able to hold both a trie node and an end node, necessitating that two locations per table entry be reserved even though only one will be used when in the path of non-overlapping prefixes. This would greatly reduce the capacity for prefix storage of any given amount of prefix memory. (Note that if two prefixes do not overlap across a segment boundary, then they will be represented by two different prefix bits in the single end node's bitmap and would not require the use of both a trie node and an end node).

The problem is solved by moving (or "pushing") the shorter prefix's end node from the original shared table entry into a special entry in the child table of the longer prefix, which can be identified from the child pointer in the longer prefix's trie node. The pushed end node becomes known as an internal node or "inode" since the end node represents prefixes that terminate in the midst of a trie node pointer chain instead of at the end. This inode is an additional entry in the child table, but is only added when necessary (i.e., when there are fully overlapping prefixes), thus solving the problem of having to reserve space for both a trie node and an end node per table entry. The format of the inode is exactly the same as a normal end node; the only difference is that the inode is placed in a table that represents the next prefix segment relative to the inode's unpushed location in the parent table, even though the inode still represents values of the previous segment—i.e., the same one as before being pushed.

When following a prefix's path through multiple tables, the inode entry of each table is always retrieved in addition to the required normal entry of each table so that two entries per table are read during the course of each search. This allows the prefixes encoded by each inode's prefix bits in their bitmap to be tested for match to the corresponding search key segment values while simultaneously searching for longer matching prefixes. In the case where more than one match is obtained due to a search key matching multiple prefixes of different lengths with fully overlapping values, then the data for the longest matching prefix is returned. This is useful for some applications such as network router look-up tables, and is known as "longest prefix match."

The disadvantages of bit-mapped multi-bit tries are that underutilized tables may be created. If prefix values are sparsely distributed, then many tables may be created handling only a few prefixes (typically one or two) but still incurring the overhead of a full table, including a pointer to the parent table's trie node and a header word for memory management and maintenance purposes.

Bit-mapped multi-bit tries may also result in creation of underutilized end nodes and inodes under the condition of spare prefix distribution. Even if a table contains a number of end nodes, each capable of pointing to many prefixes' data items (identified by the bitmap), under conditions of sparse prefix distribution each end node may point to many less data items than the maximum capability for an end node, leading to poor utilization of the end node and their bitmaps.

Bit-mapped multi-bit tries may also result in underutilized end nodes under conditions where many of the prefixes stored by a table are of fixed length. In this case, the prefix bits in the end node bitmaps that define prefixes of n different lengths (where n is the segment size) will only be used to define prefixes corresponding to one value of n. The other bits in the bitmap will be unused, the end node's data pointer will be underutilized, pointing to fewer than the maximum possible number of data items.

Figure 3:
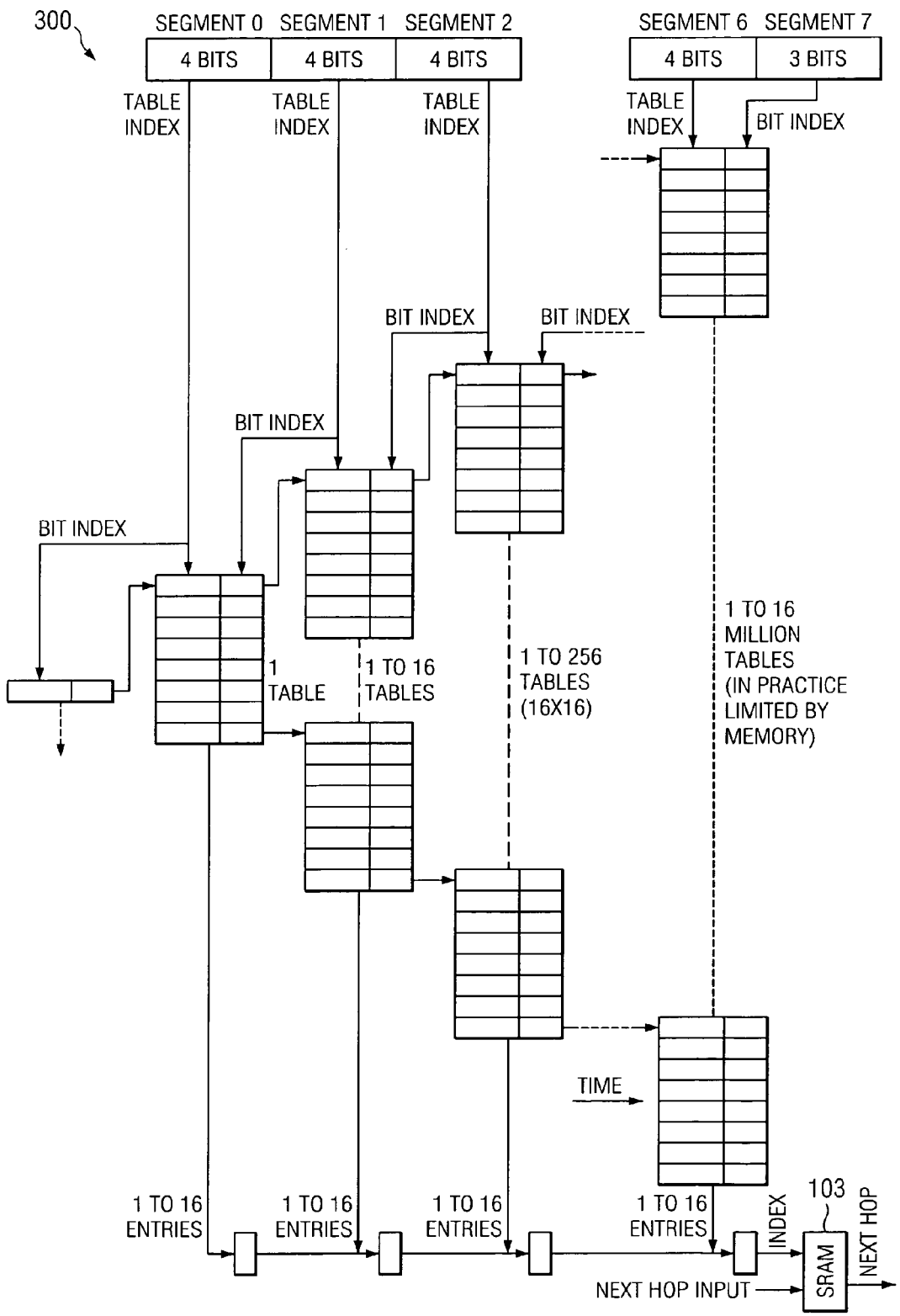
FIG. 3 illustrates a bit-mapped trie-based storage with remappable prefix representations according to one embodiment of the present invention.

FIG. 3 illustrates a bit-mapped trie-based storage with remappable prefix representations according to one embodiment of the present invention. As described above, bit-mapped multi-bit tries are compact and easily modifiable, employing bitmaps to eliminate redundant or unnecessary information and thereby reduce the amount of memory and operations required to hold and update the trie. The present invention improves on that method still further to significantly reduce the amount of memory required to represent a trie holding a given number of prefixes. The present invention allows prefixes in the internal memory to be remapped from a bit-mapped representation into what is termed a "partial-prefix" representation, which saves prefix memory in certain cases and also allows remapping to a compressed single length prefix.

Remappable multi-bit trie 300 logically divides an Internet Protocol version 4 (IPv4) address prefix into seven segments 0–7, six of 4 bits and one (the last) of 3 bits. Prefixes are stored as 4 bit segments in separate tables or table-entries, with prefix length defined by the number of tables used to define the prefix (left to right). Each prefix segment has a table entry for every value of the previous segments for that prefix, with prefixes that share the same values of the top segments also sharing table entries. Special bitmap encoding techniques are used to further reduce table size. Searches use the actual value of search key segments to navigate the tables by 4 bit indexing, and pipeline registers can be placed between tables for high throughput. The tables may use ordinary SRAM, with 16 megabits (Mb) holding at least 512K IPv4 prefixes.

FIG. 4 illustrates table entry formats for use within remappable multi-bit tries according to one embodiment of the present invention. The NPSE table and node formats for the exemplary embodiment include five standard table-entry formats described in greater detail below, including header, trie node, trie node with inode/cnode, inode and end node. In addition there are several compressed node formats described below allowing better table optimization for various prefix distributions, particularly sparse distributions. Except for pnode entries, the four least significant bits (status or type field) specify the table entry type.

FIGS. 5A and 5B illustrate table structures for remappable multi-bit tries according to one embodiment of the present invention. The formats of tables held in the NPSE's internal memory are based on words of 40 data bits plus one parity bit, with a maximum of 18 entries per table. In each NPSE pipeline stage, two 40 bit words are read from memory simultaneously. The table formats ensure that the word locations read have a maximum intervening gap of seven locations between them, which allows each memory to be organized as two banks of odd and even 8 word locations, with each bank being independently addressable and with any two words being output from the 16 accessed internally being output on each memory read.

FIG. 5A illustrates the normal table format for up to eight entries. The table includes, in sequence, a header entry, up to eight regular entries, an optional internal node (inode) or compressed end node (cnode) entry, and an optional prefix-only node (pnode) entry which may only be used with an inode or cnode. The regular entries may be trie nodes, end nodes, Compressed Single Prefix (CSP) nodes, or Compressed Double Prefix (CDP) nodes.

FIG. 5B illustrates the normal table format for nine to sixteen entries. The table includes, in sequence, a header entry, eight regular entries (which may be trie nodes, end nodes, CSP nodes or CDP nodes), an optional inode or cnode entry, up to eight additional regular entries (which also may be trie nodes, end nodes, CSP nodes or CDP nodes), and an optional prefix-only node (pnode) entry which, again, may only be used with an inode or cnode.

Referring back to FIG. 4, a normal trie node is the node normally used to point to a child table from a parent table, consisting of a 16 bit child table bitmap (ct_bitmap) that defines which of the 16 possible child table entries are valid. Each bit in the child table bitmap corresponds to one value of the child tables 4 bit prefix segment, from 0 to 15, with which each of the respective 16 possible child table entries is associated. A 20 bit child pointer (child_ptr) points to the header of the child table. This format excludes the use of an inode, cnode or pnode in the child table.

The trie node with inode/cnode is the same as the normal trie node, with the exception that the entry points to the header of a child table containing either an inode or a cnode, and optionally a pnode. For tables with up to 8 normal entries, the inode or cnode is placed at the end of the table as shown in FIG. 5A. For tables with more than 8 normal entries, the inode or cnode is placed after the eighth entry using the split-table format shown in FIG. 5B. The optional pnode is always placed at the end of the table, since this information is used to calculate the correct address of entries above the inode/cnode for split-format tables.

The inode contains up to 15 prefixes that are 0, 1, 2 or 3 bits longer than the value of the parent trie node. Since the prefixes' values are completely defined by their position within the inode's next hop bitmap (nh_bitmap) field, the inode's position in the child table is not important. However, in order to maintain a uniform child table access method, the inode is always placed after all the regular trie nodes and end nodes in tables containing up to eight normal entries, and always after the eighth trie node/end node in tables with nine to sixteen entries.

There are two types of inode: normal, and inode with pnode. The inode with pnode format is used to signify that the entry beyond the last normal entry in the table is a pnode that shares the inode's next hop pointer (nexthopptr) field, which is necessary since a pnode entry has no status field that can be used for independent identification. Each bit in the inode's nh_bitmap field defines whether one of up to fifteen prefixes with a particular length and value is valid or not (1=valid, 0=invalid). Lengths and values are defined as shown in TABLE I (L=parent node length, p=parent trie node value):

TABLE I

| nh_bitmap [15:0] | Prefix Length | Prefix Value |
|---|---|---|
| 15 | N/A | 0 = inode has no associated value<br>1 = inode has associated value that shares its nexthop_ptr |
| 14 | L | p |
| 13, 12 | L+1 | p_1, p_0 |
| 11, 10, 9, 8 | L+2 | p_11, p_10, p_01, p_00 |
| 7, 6, 5, 4, 3, 2, 1, 0 | L+3 | p_111, p_110, p_101, p_100, p_011, p_010, p_001, p_000 |

The nexthop_ptr field in an inode points to the beginning of a record in external next hop memory that holds the data associated with each of the valid prefixes in the inode. Hence nh_bitmap is used to form an index into that record.

An end node has a format similar to that of an inode, but defines prefixes that are longer than those defined by an inode in the same table. Each bit in the end node's nh_bitmap field defines whether one of up to 15 prefixes with a particular length and value is valid (1=valid, 0=invalid). Lengths and values are defined as shown in TABLE II (L=parent node length, p=parent trie node value, c=value of end node in parent's ct-bitmap field, "_"=append):

TABLE II

| nh_bitmap [15:0] | Prefix Length | Prefix Value |
|---|---|---|
| 15 | N/A | 0 = inode has no associated value<br>1 = inode has associated value that shares its nexthop_ptr |
| 14 | L+4 | P_c |
| 13, 12 | L+5 | P_c_1, p_c_0 |
| 11, 10, 9, 8 | L+6 | P_c_11, p_c_10, p_c_01, p_c_00 |
| 7, 6, 5, 4, 3, 2, 1, 0 | L+7 | P_c_111, p_c_110, p_c_101, p_c_100, p_c_011, p_c_010, p_c_001, p_c_000 |

The nexthop_ptr field in an end node points to the beginning of a record in external next hop memory that holds the data associated with each of the valid prefixes in the inode. Hence nh_bitmap is used to form an index into that record.

A CSP node is used to explicitly (as opposed to positionally) define the low-order value of a single prefix. The high-order value is defined by the value of the parent trie node, and the CSP's bit position in the parent trie node's ct_bitmap field. Since the prefix's low-order value can be up to 15 bits long, as opposed to the maximum 3 bit implicit value of a prefix in an end node, the low-order value can define a prefix up to 12 bits longer than an end node and hence eliminate up to 3 child tables for a savings of up to six entries (including headers). The caveat is that no other prefix can share the table entry—and hence overlap the low-order value, or the last 4 bits of the high-order value) Hence this encoding is used to eliminate a string of 1, 2, or 3 single entry tables that terminate in a single prefix end node. The 16 bit "prefix" field encoding is as shown in TABLE III (p=parent trie node value, c=value of end node in parent's ct_bitmap field, "_"=append):

TABLE III

| xxxxxxxxxxxxxxx1 | 15 bit low-order value | p_c_xxxxxxxxxxxxxxx |
| xxxxxxxxxxxxxx10 | 14 bit low-order value | p_c_xxxxxxxxxxxxxx |
| xxxxxxxxxxxxx100 | 13 bit low-order value | p_c_xxxxxxxxxxxxx |

TABLE III-continued

| | | |
|---|---|---|
| xxxxxxxxxxxx1000 | 12 bit low-order value | p__c__xxxxxxxxxxxx |
| xxxxxxxxxxx10000 | 11 bit low-order value | p__c__xxxxxxxxxxx |
| xxxxxxxxxx100000 | 10 bit low-order value | p__c__xxxxxxxxxx |
| xxxxxxxxx1000000 | 9 bit low-order value | p__c__xxxxxxxxx |
| xxxxxxxx10000000 | 8 bit low-order value | p__c__xxxxxxxx |
| xxxxxxx100000000 | 7 bit low-order value | p__c__xxxxxxx |
| xxxxxx1000000000 | 6 bit low-order value | p__c__xxxxxx |
| xxxxx10000000000 | 5 bit low-order value | p__c__xxxxx |
| xxxx100000000000 | 4 bit low-order value | p__c__xxxx |

A CDP node is used to explicitly define the low-order value of two prefixes. Their high-order value is defined by the value of the parent trie node, and the CDP's bit position in the parent trie node's ct_bitmap field. Since the prefixes' low-order value can be up to 7 bits long, as opposed to the maximum 3 bit implicit value of a prefix in an end node, the low-order value can define prefixes up to 4 bits longer than an end node and hence eliminate one 2 prefix child table for a savings of up to three entries (including headers). The caveat is that no other prefix can share the table entry—and hence overlap the low-order value, or the last 4 bits of the high-order value). Hence this encoding is used to eliminate a single child table that contains only 2 prefixes, one of which may be in an inode, and one or both of which may be in one or two end nodes. The 8 bit "prefix" field encoding is as shown in TABLE IV (p=parent trie node value, c=value of end node in parent's ct_bitmap field, "_"=append):

TABLE IV

| | | |
|---|---|---|
| xxxxxxx1 | 7 bit low-order value | p__c__xxxxxxx |
| xxxxxx10 | 6 bit low-order value | p__c__xxxxxx |
| xxxxx100 | 5 bit low-order value | p__c__xxxxx |
| xxxx1000 | 4 bit low-order value | p__c__xxxx |
| xxx10000 | 3 bit low-order value | p__c__xxx |
| xx100000 | 2 bit low-order value | p__c__xx |
| x1000000 | 1 bit low-order value | p__c__x |
| 10000000 | 0 bit low-order value | p__c |

A cnode has a format identical to that of a CDP node, and explicitly defines the low-order 7 bits of the two prefixes. However, unlike a CDP node, the lower 4 bits of the prefixes' high-order value is NOT dependent on the entry's position within the parent trie node's ct_bitmap field (i.e., the cnode entry has no corresponding bit in ct_bitmap), and hence the lower 4 bits of the prefixes' high-order value is position independent in the table, which makes the value useful for compressing any two single prefix end nodes or a single prefix end node/inode pair into a single position independent entry that can co-exist with any other number and type of table entries. However, because the value's position in the table is not defined by the table's prefix segment, that value must be explicitly encoded in the prefix field, which is therefore 4 bits longer than the equivalent prefix field in the positional CDP node, relative to their respective tables.

To ensure that the cnode is always accessed correctly, the cnode is always placed in a table's "inode" slot (see FIGS. 5A and 5B), and can be used only with tables that have no inodes or tables that have single prefix inodes that can be encoded into the cnode along with a single prefix end node. When encoding one or two end nodes into a cnode, those end nodes' ct_bitmap bits in their parent trie node are cleared, and the parent trie node type is changed to "trie node with inode or cnode" to ensure that on a search, the normal table entries will still be indexed correctly, while the cnode will always be an output from the table so that the prefixes may be checked for a match with the current prefix segments. The 8 bit "prefix" field encoding is shown in TABLE V (p=parent trie node value, "_"=append):

TABLE V

| | | |
|---|---|---|
| xxxxxxx1 | 7 bit low-order value | p__xxxxxxx |
| xxxxxx10 | 6 bit low-order value | p__xxxxxx |
| xxxxx100 | 5 bit low-order value | p__xxxxx |
| xxxx1000 | 4 bit low-order value | p__xxxx |
| xxx10000 | 3 bit low-order value (inode) | p__xxx |
| xx100000 | 2 bit low-order value (inode) | p__xx |
| x1000000 | 1 bit low-order value (inode) | p__x |
| 10000000 | 0 bit low-order value (inode) | p |
| 00000000 | Invalid | — |

There are two types of anode: normal and anode with pnode. The anode with pnode format is used to signify that the entry beyond the last normal entry in the table is a pnode that shares the inode's nexthop_ptr field, which is necessary since a pnode has no status field that can be employed for independent identification.

A pnode is similar to a anode, containing five 8 bit prefix fields that are similar in format and significance to the prefix fields of a anode and are used to encode prefixes with 4 to 7 low-order bits. Prefixes less than 4 bits long cannot be placed in a pnode since such prefixes must be placed in the table's inode or anode to guarantee that the prefix are output every time the table is searched. Like anodes, the pnode is position-independent within the table, but is always placed as the last entry in the table.

A pnode contains no nexthop_ptr field to indicate where the prefixes are stored in external memory, and must therefore "borrow" the nexthop_ptr field from another end node in the same table. The nexthop_ptr field is therefore borrowed from the table's inode or cnode entry as follows: If the table contains an inode, then the pnode's prefixes are bound to the inodes nexthop_ptr field; the total number of prefixes in the inode plus the pnode must be 16 or less. If the table contains a cnode instead of an inode, then the pnode's prefixes are bound to the cnode's nexthop_ptr field (a cnode may be deliberately inserted into a table in order to enable the use of a pnode); the total number of prefixes that can be encoded by the cnode plus the pnode in this case is 7.

When compressing normal end nodes into a pnode, the corresponding bits in the parent trie node's ct_bitmap filed must be cleared. If that trie node is selected by a search key but the ct_bitmap bit is selected by the lower-order search key field is not set, then the last entry plus one of the child table is selected for output to ensure that, if a pnode has been placed at the end of a child table, that pnode will be selected if no other valid entry is selected. The other output will be either the child tables inode or cnode if present, or the last valid entry of the table if not present, thus providing the nexthop_ptr field for the pnode.

Finally, in the case where a table contains an inode with 15 or 16 prefixes already used, then a cnode may be placed as the last entry in the table instead of a pnode, as long as there are at least two single prefix end nodes available for compression into the cnode. The pnode's 8 bit "prefix" field encoding is shown in TABLE VI (p=parent trie node value, "_"=append):

TABLE VI

| | | |
|---|---|---|
| xxxxxxx1 | 7 bit low-order value | p__xxxxxxx |
| xxxxxx10 | 6 bit low-order value | p__xxxxxx |

TABLE VI-continued

| xxxxx100 | 5 bit low-order value | p_xxxxx |
| xxxx1000 | 4 bit low-order value | p_xxxx |
| 00000000 | Invalid | — |

The remappable multi-bit trie of the present invention improves on the standard multi-bit trie by solving the disadvantages described above. Simulations of the standard bit-mapped multi-bit trie show that in many applications a large proportion of tables contain only one or two end nodes, or an inode and an end node, to represent just one or two prefixes. For instance, if the prefix segment size n is 4 bits, then the table may typically contain: only one end node out of a possible sixteen, with only 1 or 2 out of 15 prefix bits set; two end nodes out of a possible sixteen, each with only 1 out of 15 prefix bits set; or one inode with only 1 out of 15 prefix bits set, plus one end node with only 1 out for 15 prefix bits set. Each of these scenarios may be optimized by remapping the prefix bits in the end node or inode into an explicitly coded portion of the prefix called a partial prefix, and pulling the resulting partial prefix back into the parent table, where the partial prefix replaces the original trie node pointing to the child table. This saves memory by allowing the child table to be deleted.

For instance, if in the example of n=4 each end node has a positional value of $2^4$ to represent a 4 bit value of the table's prefix segment, plus each prefix bit in the end node's 15 bit bitmap represents the values of up to 3 successive bits beyond the current table's segment, then any given prefix bit can be converted to a partial prefix with a maximum length of 7 bits, representing 4 bits of the current table's segment and up to further 3 bits. The partial prefix is position independent within the current table since the partial prefix's previous position within the table was explicitly coded into the first 4 bits. This allows the partial prefix to be pulled into the parent table, where the partial prefix replaces the trie node pointing to the original table (which may then be deleted).

In fact, remapping more than one partial prefix into a single entry is possible, where the single entry can be pulled into the parent table. For instance, in the example of n=4, a trie node has an associated 16 bit bitmap (to indicate the validity of one of 16 segment values), but a partial prefix that has been remapped from a child table entry has a maximum of 7 bits. Thus two partial prefixes may be placed in the space vacated by the parent table's deleted trie node bitmap, and the deleted trie node's child pointer is replaced with a data pointer to identify the data items associated with the partial prefixes. In fact, each partial prefix in this case could be from 0 to 7 bits long, which could be either a 0 to 3 bit partial prefix formed from an inode prefix bit in the deleted table's inode, or a 4 to 7 bit partial prefix formed from an end node prefix bit in a deleted table's end node. The differing length of the partial prefixes may be run-length encoded into a field just one bit longer than the maximum partial prefix length—i.e., 8 bits in the case of the example.

In addition, if a child table contains only a single prefix (i.e., has only one end node with one prefix bit set), then there will be room in the parent table's trie node bitmap not only for the child table entry and bitmap position in the deleted child table, but also for encoding the position of the child table's trie node in the parent table. This gives the advantage that if the remapped single partial prefix is the only entry in the parent table after remapping and deletion of the child table, then the parent table can also be deleted, and the single partial prefix placed in the grandparent table of the child table, where the partial prefix replaces the grandparent trie node. For instance, in the n=4 example, a single partial prefix could be from 4 to 15 bits in length, allowing the partial prefix to replace both a single prefix child table and optionally a single prefix parent table.

In the present invention, the type of table entry containing two partial prefixes along with a data pointer, remapped from a deleted child table that contained 2 prefixes, is called a Compressed Double Prefix (CDP) node. The type of table entry containing a single partial prefix along with a data pointer, remapped from both a deleted child table and parent table, is called a Compressed Single Prefix (CSP) node.

If a table header used for table maintenance is the same size as a regular entry, then remapping a child table into a CDP node saves either two or three entries, depending on whether the partial prefixes were originally from the same or different entries. Similarly, a CSP node saves 2 or 4 entries, depending on whether the CSP node encodes a partial prefix wide enough to delete just a child table or both a child table and the parent table.

Figure 6A:
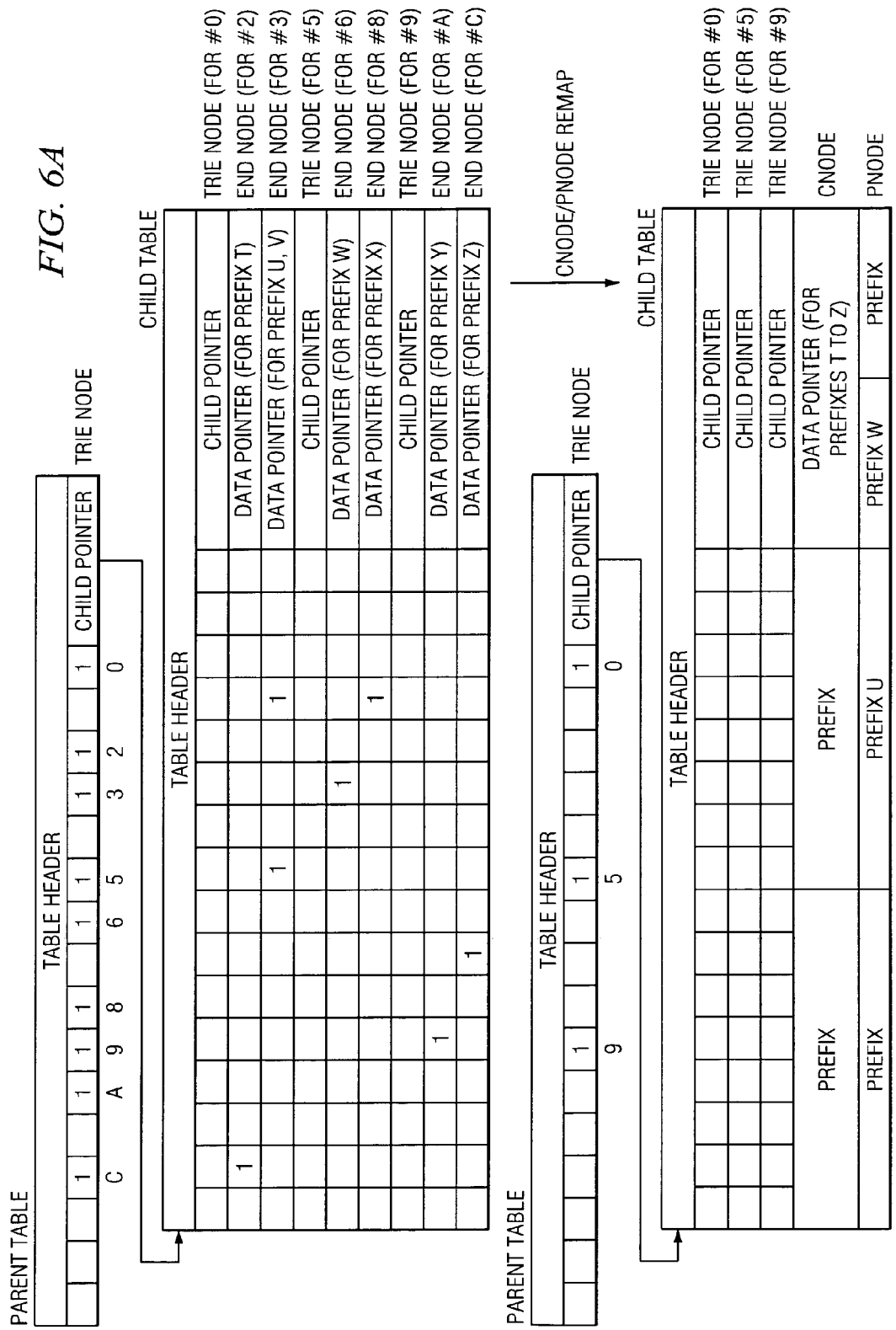
Figure 6C:
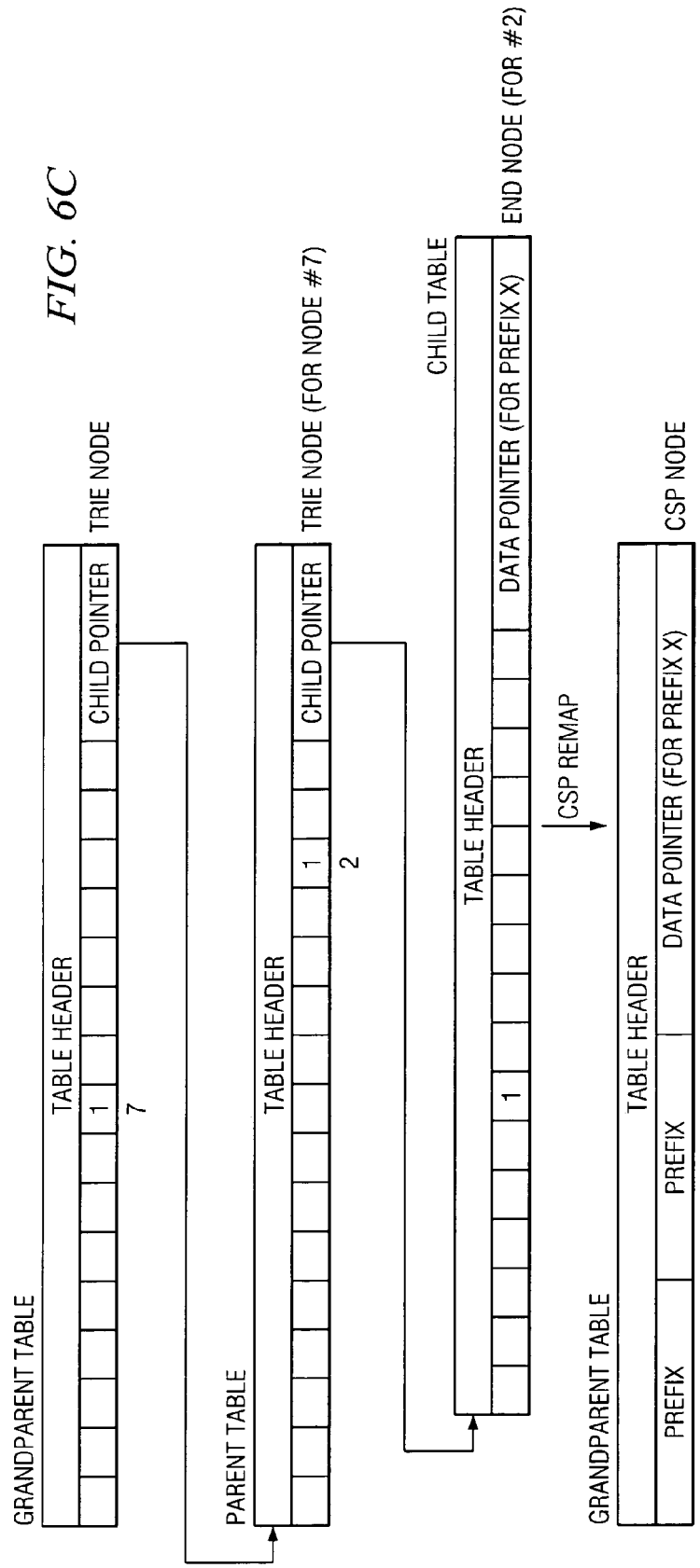

FIGS. 6A through 6C illustrate various trie table entry remappings using multi-bit tries according to one embodiment of the present invention. FIG. 6A illustrates a cnode/pnode remap, in which a child table having six separate end nodes is compressed to save 4 table entries. FIG. 6B illustrates a CDP remap, in which a child table having an end node and an inode is collapsed into the parent table, saving one table consisting of three table entries. FIG. 6C illustrates a CSP remap, in which a parent table and a child table are both collapsed into a grandparent table, saving two tables consisting of 4 table entries.

Solving underutilization of end nodes calls for a similar remapping approach. Simulations of typical prefix distributions show that there are many tables created by the bit-mapped multi-bit trie that have end nodes with just a few (typically one or two) prefix bits set in the bitmap field, but yet do not permit application of the CSP node or CDP node optimiazation described above because the tables contain too many prefixes or have mixed end nodes and trie nodes.

To optimize the use of end nodes, each end node should point to as many data items as possible, which can be done by remapping end nodes with sparse bitmaps into one or two special nodes containing partial prefixes. In the present invention, these nodes are called compressed end nodes (cnodes) and prefix-only or prefix nodes (pnodes). A pnode can only be used with either an inode or a cnode, and a cnode can only be used if there is originally no inode in the table. Together, a cnode/pnode or inode/pnode pair are able to merge multiple end nodes with sparse prefix bitmaps into just two entries. Prefixes represented as prefix bits in an end node's bitmap are remapped into position-independent partial prefixes in exactly the same way described above for CDP/CSP optimization. For instance, in the example of n=4, a partial prefix that has been remapped from an end node prefix bit has a maximum of seven bits plus one extra bit for run length encoding as described in further detail below, for a total of eight bits. Since partial prefixes are position independent within the original table, the partial prefixes can be packed into a single pnode entry, which is typically wide enough to hold a number of partial prefixes.

The pnode contains only partial prefixes, but no data pointer, which must be provided by either a cnode or an inode. If there is originally no inode within the table before remapping, then a cnode must be created containing a data pointer identifying the data memory location holding the data items for the partial prefixes. If an inode is present in the original table, then no cnode is created and the pnode shares the inodes's data pointer. A cnode usually has room for more partial prefixes to be placed therein in addition to the data pointer.

By way of functional operation of the pnode, when prefix bits from end nodes are recoded into a pnode/inode or pnode/cnode pair, the original end nodes are deleted and the bits that correspond to those deleted entries in the parent table's trie node bitmap are cleared. The cnode, if needed (i.e., if there was originally no inode), is placed in the child table's inode location, where the entry is always read by default during a prefix search, while the pnode is placed at the very end of the table (or at some special default location). When searching for a prefix by following a chain of trie nodes through successive tables, the inode or cnode is always read by default. In addition, if the table does not contain a normal entry for the value of the current search key segment, then a second default table entry is retrieved. This second default table entry is always the pnode if the table contains one. This basic mechanism allows prefixes that have been remapped from deleted end nodes into pnodes to be retrieved by default, since a miss on the original deleted entries caused by the clearing of the corresponding bits in the parent table's trie node will cause the remapped versions of the partial prefixes to be retrieved by default via the pnode. The partial prefixes in the pnode and cnode can then be examined to determine whether they match the current search key segment values. If so, the corresponding data items in data memory are identified by the data pointer in the cnode or inode, along with an offset calculated from the relative position of the partial prefix within the pnode.

For instance, in the exemplary embodiment of the invention depicted in FIG. 4, the prefix segment size is 4 bits and table entries are 40 bits long, including a 20 bit data pointer or child pointer, a 16 bit bitmap, and a 4 bit control (status and/or type) field. A prefix remapped from a bitmapped representation to a partial prefix representation will be 8 bits long, therefore 5 of the 8 bits can fit in a pnode, and 2 in a cnode (which also contains a data pointer). Thus, if a table contains at least 3 end nodes, with the total number of bitmapped prefixes stored therein being seven or less, then those prefixes can be remapped into partial prefixes that can be stored in a pnode/cnode or pnode/inode pair, and the original entries deleted, saving from 1 to 5 table entries, depending on the initial configuration.

CSP, CDP and cnode/pnode optimizations are applied hierarchically. CSP node optimization is applied first. If insertion of a new prefix would create a table with only one single prefix end node, then that end node can be converted to a 4 to 7 bit CSP node and placed in the parent table. In turn, if that parent table then contains only that single 4–7 bit CSP node, the CSP node can be moved back into the grandparent table and converted to an 7 to 11 bit prefix. Finally, if the grandparent table then contains only that 7 to 11 bit prefix, the prefix can be moved back into the great-grandparent table as an 11 to 15 bit prefix.

A CSP node may be created both on insertion and deletion of a prefix into the prefix tables. On insertion, a CSP node is used whenever a new table entry is first created along the insertion path for the new prefix, and the prefix is no more than 15 bits longer than the table's 4 bit prefix segment. If the new prefix fully overlaps the path of an existing shorter CSP node, then the existing CSP node must be either converted into an inode, or combined with the new prefix into a CDP node as described below. On deletion, a CSP node is created if a table with only a single prefix normal end node remains, which can then be moved back into the parent, grandparent or great-grandparent table. A CSP node can also be created when one of the prefixes encoded by a CDP node as described below is deleted, and the table that contained the CDP had one or two single prefix ancestor tables.

CDP optimization is then applied. If insertion of a new prefix would create a table with only two prefixes, then those two prefixes can be encoded into a CDP node that can be moved into the parent table. This includes tables that contain a single prefix plus a single prefix normal end node, two normal end nodes each with a single prefix, and one normal end node with two profixes.

A CDP node can be created both on insertion and deletion of a prefix in the prefix tables. On insertion, a CDP node is typically created when the new prefix overlaps an existing CSP node. The CSP node must be expanded into a normal end node or inode, after which, if the existing prefix occupies the same table as the new prefix, the two prefixes may be combined into a parent table CDP node. On deletion, a parent CDP node is created if a table with only two prefixes in a normal end node/inode combination remains.

If, after insertion or deletion of a prefix in the prefix tables, and after CSP and CDP node optimizations, the following conditions apply, then a table may be eligible for cnode/pnode optimization. The candidate tables can be heterogeneous, containing any type and number of end nodes, trie nodes, CSP ndoes and CDP nodes.

If the table contains an inode with 2 to 14 prefixes, and there are two or more end nodes in the table with a total prefix count of 5 or less (or 4 or less, 3 or less, or 2 if the number of inode prefixes is 12, 13 or 14 respectively), then a pnode is inserted at the end of the table, and up to 5 prefixes are placed in the pnode entry. The total inode plus pnode prefix count must not exceed sixteen. The table is scanned and the number of end nodes with 1, 2, 3 and 4 prefixes is counted, then the maximum number of 1 prefix nodes (up to 5) are encoded into the pnode, followed by the maximum number of 2 prefix end nodes (1 or 2), followed by one 3 prefix end node or one 4 prefix end node if space remains available. The end nodes are deleted from the table and the corresponding bits in the parent bitmap are cleared. The original inode's status field is changed to convert the inode entry to an inode with pnode type entry. On a search, the inode and the pnode will be output by default if no other nodes are selected, and the pnode's prefixes will share the nexthop_ptr field in the inode.

If the table contains an inode with only 1 prefix, and there are two or more end nodes in the table with a total prefix count of 6 or less, then the inode is replaced with a cnode with pnode entry, and a pnode is inserted at the end of the table. The single prefix from the replaced inode is placed in one of the cnode's prefix slots, leaving 6 more prefix slots for end node optimization. Then the maximum number of end nodes are coded into the cnode and pnode using the same procedure described above, but extending the limit to up to 5 prefix end nodes. On a search, the cnode and pnode will be output by default if no other nodes are selected, and the pnode's prefixes will share the nexthop_ptr field in the cnode.

If the table contains no inode, and there are three or more end nodes in the table with a total prefix count of 7 or less, then a cnode with pnode is placed in the table's inode slot, and a pnode is inserted at the end of the table, giving 7 prefix slots for end node optimization. Then the maximum number of end nodes are coded into the cnode and pnode using the same procedure described above, but again extending the limit to up to 5 prefix end nodes. On a search, the cnode and pnode will be output by default if no other nodes are selected, and the pnode's prefixes will share the nexthop_ptr field in the cnode.

If none of the optimization criteria for cnode/pnode optimization described above apply, but the table contains a 1 prefix inode and a 1 prefix end node, or no inode and two 1 prefix end nodes, then a cnode (without pnode) is placed in the table's inode slot and the two prefixes are encoded into the cnode entry. The encoded end nodes are deleted and the corresponding bits in the parent bitmap are cleared.

FIGS. 7A and 7B illustrate run length encoding of partial prefix entries for remappable multi-bit tries according to one embodiment of the present invention. Multiple length prefixes may be encoded using run length encoding, where wasted space in the field may be employed to explicitly represent the prefix length. FIG. 7A illustrates run length encoding of prefixes greater than three bits and up to 15 bits in length. The run length encoded leading zeros and the position of the leading one indicates the length of the prefix represented in the bitmap, with the prefix represented by the bits (indicated as X's) following the leading one. Three examples—a 15 bit prefix, a 14 bit prefix, and a 4 bit prefix—are shown in FIG. 7A. FIG. 7B illustrates trade-off between the maximum possible prefix length (7 bits in this example) and the number of prefixes that may be encoded in a given space (2 prefixes in this example). This makes the format flexible to different routing distributions while retaining the compact nature. The type field may be employed to differentiate normal prefix encoding versus run length encoding and/or run length encoding size (e.g., one 15 bit prefix versus two 7 bit prefixes).

The present invention enables an end node's bitmapped prefix representation to be remapped into a partial prefix representation, and multiple partial prefixes to be merged into a single position-independent table entry (CSP nodes, CDP nodes, pnodes and/or cnodes). The partial prefix entry may then be pulled into an ancestor table to allow deletion of the entire child table (for CSP and CDP nodes) or place the partial prefix entry in a default location of the original table to allow the original end nodes that were remapped to be deleted. Statistical analysis over several routing table samples have shown that the compressed node formats of the present invention reduce table sizes by at least 25% for typical prefix distributions.

Partial solutions for storing prefixes algorithmically are based on various implementations of tree structures, ranging from B-trees to various implementations of multi-bit tries. The present invention reduces the amount of memory needed to store a given number of prefixes by a minimum of 25% relative to the best prior solution.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for utilizing a bitmapped multi-bit trie comprising:
   a search engine maintaining or utilizing prefix tables for a multi-bit trie including one or more compressed table entries selected from:
      a compressed end node (cnode) entry containing one or more encoded portions of prefixes for one or two end nodes and a data pointer;
      a prefix-only node (pnode) entry containing one or more encoded portions of prefixes;
      a compressed single prefix (CSP) node entry containing an encoded portion of a prefix for a string of single entry child tables terminating in a single prefix end node and a data pointer; and
      a compressed double prefix (CDP) node entry containing encoded portions of prefixes for a child table containing only two entries and a data pointer,
   wherein use of the one or more compressed entries saves at least one prefix table or prefix table entry.

2. The system according to claim 1, wherein the search engine, upon insertion of a prefix into or deletion of a prefix from the prefix tables, remaps entries within the prefix tables to one or more of a cnode entry, a pnode entry, a CSP node entry and a CDP node entry.

3. The system according to claim 2, wherein the search engine, during remapping of an entry within the prefix tables, explicitly codes a portion of the prefix within the entry and pulls the encoded prefix portion into a parent table for the table containing the remapped entry, deleting the table originally containing the remapped entry.

4. The system according to claim 1, wherein the search engine encodes variable length portions of prefixes using run length encoding explicitly indicating, within an encoded value, a length of an encoded prefix portion.

5. The system according to claim 1, wherein the search engine employs a pnode entry only in association with a cnode entry or an internal node (inode) entry, wherein a data pointer within the cnode or inode entry is employed for the pnode entry with an offset based upon a position of an encoded prefix portion within the pnode entry.

6. The system according to claim 1, wherein the search engine employs a cnode entry and a pnode entry to compress a table having at least one trie node entry and more than two end node entries.

7. The system according to claim 1, wherein the search engine places a cnode entry at a location within a prefix table normally occupied by an internal node (inode) entry, and places a pnode entry at the end of the prefix table.

8. The system according to claim 1, wherein the search engine is a network packet search engine coupled to a system controller and an external memory.

9. A method for utilizing a bitmapped multi-bit trie comprising:
   maintaining or utilizing prefix tables for a multi-bit trie including one or more compressed table entries selected from:
      a compressed end node (cnode) entry containing one or more encoded portions of prefixes for one or two end nodes and a data pointer;

a prefix-only node (pnode) entry containing one or more encoded portions of prefixes;

a compressed single prefix (CSP) node entry containing an encoded portion of a prefix for a string of single entry child tables terminating in a single prefix end node and a data pointer; and a compressed double prefix (CDP) node entry containing encoded portions of prefixes for a child table containing only two entries and a data pointer, and searching for a specified prefix in the multi-bit trie using the prefix tables to access data associated with the specified prefix;

wherein use of the one or more compressed entries saves at least one prefix table or prefix table entry.

10. The method according to claim 9, further comprising:

upon insertion of a prefix into or deletion of a prefix from the prefix tables, remapping entries within the prefix tables to one or more of a cnode entry, a pnode entry, a CSP node entry and a CDP node entry.

11. The method according to claim 10, further comprising:

during remapping of an entry within the prefix tables, explicitly coding a portion of the prefix within the entry and pulls the encoded prefix portion into a parent table for the table containing the remapped entry; and deleting the table originally containing the remapped entry.

12. The method according to claim 9, further comprising:

encoding variable length portions of prefixes using run length encoding explicitly indicating, within an encoded value, a length of an encoded prefix portion.

13. The method according to claim 9, further comprising:

employing a pnode entry only in association with a cnode entry or an internal node (inode) entry, wherein a data pointer within the cnode or inode entry is employed for the pnode entry with an offset based upon a position of an encoded prefix portion within the pnode entry.

14. The method according to claim 9, further comprising:

employing a cnode entry and a pnode entry to compress a table having at least one trie node entry and more than two end node entries.

15. The method according to claim 9, further comprising:

placing a cnode entry at a location within a prefix table normally occupied by an internal node (inode) entry; and placing a pnode entry at the end of the prefix table.

16. The method according to claim 1, further comprising:

maintaining and utilizing the prefix tables with a network packet search engine coupled to a system controller and an external memory.

17. A bitmapped multi-bit trie comprising:

prefix tables for a multi-bit trie including one or more compressed table entries selected from:

a compressed end node (cnode) entry containing one or more encoded portions of prefixes for one or two end nodes and a data pointer;

a prefix-only node (pnode) entry containing one or more encoded portions of prefixes;

a compressed single prefix (CSP) node entry containing an encoded portion of a prefix for a string of single entry child tables terminating in a single prefix end node and a data pointer; and a compressed double prefix (CDP) node entry containing encoded portions of prefixes for a child table containing only two entries and a data pointer, wherein use of the one or more compressed entries saves at least one prefix table or prefix table entry; and wherein the multi-bit trie is searchable using the prefix tables and a specified prefix to access data associated with the specified prefix.

18. The trie according to claim 17, wherein, upon insertion of a prefix into or deletion of a prefix from the prefix tables, entries within the prefix tables are remapped to one or more of a cnode entry, a pnode entry, a CSP node entry and a CDP node entry.

19. The trie according to claim 18, wherein, during remapping of an entry within the prefix tables, a portion of the prefix within the entry is explicitly coded and the encoded prefix portion is pulled into a parent table for the table containing the remapped entry, deleting the table originally containing the remapped entry.

20. The trie according to claim 17, further comprising:

variable length portions of prefixes encoded using run length encoding explicitly indicating, within an encoded value, a length of an encoded prefix portion.

21. The trie according to claim 17, further comprising:

a pnode entry only in association with a cnode entry or an internal node (inode) entry; and a data pointer within the cnode or inode entry, employed for the pnode entry with an offset based upon a position of an encoded prefix portion within the pnode entry.

22. The trie according to claim 17, further comprising:

a cnode entry and a pnode entry employed to compress a table having at least one trie node entry and more than two end node entries.

23. The trie according to claim 17, further comprising:

a cnode entry at a location within a prefix table normally occupied by an internal node (inode) entry; and a pnode entry at the end of the prefix table.

24. The trie according to claim 17, wherein the prefix tables are located within a network packet search engine coupled to a system controller and an external memory.

* * * * *